US012000180B2

(12) United States Patent
Lammich et al.

(10) Patent No.: US 12,000,180 B2
(45) Date of Patent: Jun. 4, 2024

(54) VEHICLE DOOR HANDLE WITH MULTIPLE SWITCHING UNITS

(71) Applicant: Minebea AccessSolutions Deutschland GmbH, Erdweg (DE)

(72) Inventors: Marc-Tell Lammich, Erdweg (DE); Dietmar Krauss, Erdweg (DE); Valerio Vona, Erdweg (DE); Rajni Chauhan, Erdweg (DE)

(73) Assignee: Minebea AccessSolutions Deutschland GmbH, Erdweg (DE)

( * ) Notice: Subject to any disclaimer, the term of this patent is extended or adjusted under 35 U.S.C. 154(b) by 546 days.

(21) Appl. No.: 17/178,568

(22) Filed: Feb. 18, 2021

(65) Prior Publication Data

US 2021/0262254 A1 Aug. 26, 2021

(30) Foreign Application Priority Data

Feb. 20, 2020 (EP) .................................... 20158614

(51) Int. Cl.
*E05B 81/76* (2014.01)
*H01H 9/54* (2006.01)

(52) U.S. Cl.
CPC ............... *E05B 81/76* (2013.01); *H01H 9/54* (2013.01); *E05Y 2400/854* (2013.01)

(58) Field of Classification Search
CPC ............................... H01L 29/063; E05B 81/76
USPC ......................................................... 307/10.1
See application file for complete search history.

(56) References Cited

U.S. PATENT DOCUMENTS

| | | | | |
|---|---|---|---|---|
| 4,683,975 A * | 8/1987 | Booth | E05F 15/695 | 180/289 |
| 6,515,377 B1 * | 2/2003 | Ubelein | B60J 7/0573 | 307/9.1 |
| 7,064,456 B2 * | 6/2006 | Hirota | E05B 77/54 | 180/274 |
| 7,589,431 B2 * | 9/2009 | Hentsch | E05B 81/77 | 307/10.1 |
| 9,080,355 B2 * | 7/2015 | Brose | E05B 81/56 | |
| 2002/0163429 A1 * | 11/2002 | Otterbach | B60R 21/017 | 340/517 |

(Continued)

FOREIGN PATENT DOCUMENTS

| | | |
|---|---|---|
| EP | 1544388 | 6/2005 |
| EP | 2336465 | 6/2011 |
| EP | 2990572 | 2/2018 |

OTHER PUBLICATIONS

EP Application No. EP20158614.6, European Search Report, dated Sep. 8, 2020, 8 pages.

*Primary Examiner* — Ryan Jager
(74) *Attorney, Agent, or Firm* — DLA PIPER LLP (US)

(57) ABSTRACT

A vehicle door handle and a corresponding system is described. The vehicle door handle comprises a first pair of switches with a first on-off switching unit and a second on-off switching unit, wherein the switching units of the first pair of switches are arranged adjacent to one another on the car door handle, the first on-off switching unit is connectable to a first input of a control unit as to control switching between a high level and a low level at the first input, and the second on-off switching unit is connectable to a second input of the control unit as to control switching between a high level and a low level at the second input.

20 Claims, 3 Drawing Sheets

(56) References Cited

U.S. PATENT DOCUMENTS

| | | | | |
|---|---|---|---|---|
| 2003/0184098 | A1 * | 10/2003 | Aiyama | E05B 81/78<br>292/216 |
| 2021/0262254 | A1 * | 8/2021 | Lammich | H01H 9/54 |

* cited by examiner

VEHICLE DOOR HANDLE WITH MULTIPLE SWITCHING UNITS

CROSS REFERENCE TO RELATED APPLICATIONS

This application claims priority to European Application No. 20158614.6, filed Feb. 20, 2020, the content of which is incorporated herein by reference in its entirety.

TECHNICAL FIELD

The present invention relates to a vehicle door handle (for example, a car door handle) with integrated switching units for increasing reliability of the switching while minimizing handle dimensions.

BACKGROUND

In current electronic car door handles, a switch is integrated for opening and closing the door. In the prior art a single pole double throw, SPDT, the switch is integrated with inverted output signals. In detail, the SPDT switch switches between a normally closed and a normally open state and the two output terminals are connected to a control unit which may detect the switching of the SPDT switch by evaluating two input signals, the normally open input signal and the normally closed input signal.

However, the implementation has the drawback that the thickness of an SPDT mechanical switch is often too big for modern compact vehicle handles, for example car door handles. Further, there are safety drawbacks; for example, if the switch gets stuck, this error state is not easily distinguishable from persons permanent operation. In addition, mechanical vibrations may lead to opening the door due to a short activation by an undesired switching from one state to the other of the single SPDT switching unit.

Hence, a vehicle door handle and a system having smaller dimensions and increased security may be advantageous.

SUMMARY

The present invention describes, inter alia, a vehicle door handle and a corresponding system comprising said vehicle door handle.

In a first aspect, a vehicle car door handle comprises a first pair of switches with a first on-off switching unit and a second on-off switching unit.

An on-off switching unit may also be referred to as a single pull single throw switch. Such an on-off switching unit may be implemented for example by a micro-switch. The vehicle door handle may be a car door handle.

The switching units of the first pair of switches are arranged adjacent to one another on the car door handle.

Hence, the switching units are arranged next each other. As described herein, “adjacent” can be understood as arranged in manner that the activation of both switches can be achieved with one finger of a person’s hand at the same time. Hence, in one embodiment, the distance between the switches should be less than 1 cm.

The first switching unit is connectable to a first input of a control unit to control switching between a higher level and a lower level at the first input.

Hence, in one embodiment, the first switching unit is to be connected to two different potentials, for example ground and a potential of a positive voltage, in a manner that the potential at the first input of the control unit switches between a higher level and a lower level, for example between the first potential and the second potential, if the switching unit is pressed.

In a similar manner, the second switching unit is connectable to a second input of the control unit for switching between a higher level and a lower level at the second input.

Hence, if a user activates the two switching units at the same time, the control unit can evaluate the two input signals at the first input of the control unit and at the second input of the control unit to evaluate whether both switching units have been activated which allows for a secure detection of a request for opening a car door for various reasons.

First, using two switching units easily allows a controller to distinguish between malfunctioning of one of the switching units and an activation of a user, since it is very unlikely that both switching units are malfunctioning (e.g., getting stuck) at the same time. Hence, compared to the conventional systems, detecting malfunctioning of a switching unit is possible. In addition, the implementation is highly resistant against mechanical vibrations, since there is less probability that one pair of switches will be pressed at the same time due to vibration compared to the probability of switching a single switching unit. As a safety measure, if it is detected that one of the switching units is in an error state (e.g., due to an accident) the invention still supports a degradation concept since if one channel is defective there is always one other channel to be used in an emergency mode, implemented in the control unit. Furthermore, since the switching units may be implemented as micro switches, the overall dimensions (e.g., the thickness of the vehicle door handle) may be reduced.

In a further embodiment, the first terminal of the first on-off switching unit is connected to a first potential via a first resistor. Further, a second terminal of the first on-off switching unit is connected to a second potential via a second resistor. The second terminal of the first on-off switching unit is in turn connectable to the first input of the control unit. A first terminal of the second on-off switching unit is connected to the first potential via a third resistor. A second terminal of the second on-off switching unit is connected to the second potential via a fourth resistor and the second terminal of the second on-off switching unit is connectable to the second input of the control unit.

Hence, according to this configuration, the switching between the high level and the lower level at the first input and at the second input of the control unit is achieved by connecting the switching units in a manner via resistors to the first potential and the second potential such that, dependent on the state of the switching units, the inputs of the control unit are pulled up or pulled down to the first potential or to the second potential, respectively.

According to a further embodiment, the vehicle door handle is further provided with an inverting unit. This inverting unit comprises a first terminal, a second terminal, and a third terminal.

A first terminal of the first on-off switching unit is connected to a first potential via a first resistor. A second terminal of the first on-off switching unit is connected to a second potential via a second resistor. The second terminal of the first on-off switching unit is in turn connectable to the first input of the control unit. A first terminal of the second on-off switching unit is connected to the first terminal of the inverting unit. A second terminal of the second on-off switching unit is connected to the second potential via a fourth resistor, and the second terminal of the second on-off switching unit is connect-able to the second input of the control unit. The second terminal of the inverting unit is connected to the first terminal of a third resistor. A second terminal of the third resistor is connected to the second terminal of the second on-off switching unit. The third terminal of the inverting unit is connected to the first potential. In addition, the inverting unit is arranged to connect the second terminal of the inverting unit to the third terminal of the inverting unit if the second switch is open and disconnect the second terminal of the inverting unit from the third terminal of the inverting unit if the second switch is closed.

Hence, according to this embodiment, the inverting unit is included into the vehicle door handle, which basically allows to invert the functionality of the second on-off switching unit such that a second branch comprising the second on-off switching unit and being connectable to the second input of the control unit, behaves in the opposite way than a first branch which includes the first on-off switching unit and is connectable to the first input of the control unit.

Hence, this configuration allows to exactly mimic the behavior of conventional SPDT units as one of the inputs of the control unit is pulled up to a high level while the other is at the same time pulled down to a lower level. This allows for an easier replacement of the system with the car door handle comprising multiple independent on-off switching units while keeping the above described security benefits and the benefits in increased mechanical dimensions.

According to a further embodiment, the inverting unit may comprise a first and a second transistor, wherein the first transistor is a PNP transistor and the second transistor is a NPN transistor.

With the use of a transistor net comprising two complementary transistors, namely an NPN and a PNP transistor, fast and reliable switching may be achieved as the necessary voltage difference for the switching is reduced. Here, in one embodiment, the first terminal of the second on-off switching unit may be connected to the base of either the first transistor or the second transistor, while the collector of this transistor is then connected to the base of the other of the two transistors.

In a further embodiment, the first potential is ground and the second potential is a positive voltage. Furthermore, the second and the fourth resistors may now be referred to as pull up resistors.

However, also the first potential may be the positive voltage and the second potential may be ground.

According to a further embodiment, the first potential is ground and the second potential is a positive voltage. The emitter of the first transistor is connected to the second terminal of the second on-off switching unit and the emitter of the second transistor is connected to ground. Furthermore, a fifth resistor is connected between the first terminal of the second on-off switching unit and ground, a sixth resistor is connected between the first terminal of the second on-off switching unit and base of the first transistor, a seventh resistor is connected between the collector of the first transistor and the base of the second transistor, an eighth resistor is connected between the base of the second transistor and ground, and the collector of the second transistor is connected to the second terminal of the inverting unit.

Hence, in this embodiment, the inverter unit is formed by a transistor net of the NPN and the PNP transistor which are connected in a manner that allows to achieve the intended inverting behavior of the second on-off switching unit and further allows for a rapid and reliable switching between the states.

As to further allow for an easy activation of the opening and closing of the door by the user, additional switching pairs may be used and integrated into the vehicle door handle.

Here, in one embodiment, a second pair of switches with a third on-off switching unit and a fourth on-off switching unit is provided, wherein the third on-off switching unit is connected in parallel to the first on-off switching unit and the fourth on-off switching unit is connected in parallel to the second on-off switching unit. Here, the switching units of the second pair of switches are again arranged adjacent to one another on the car door handle.

The first pair of switches and the second pair of switches are in turn spaced apart.

Hence, by integrating multiple pairs of switching units, a larger area of the car door handle may be used to request opening or closing of the door by the user. Since the switches of one pair are connected in parallel to the switches of another pair, always one pair of switches needs to be pressed to request opening of the door. In a similar manner, additional pair of switches may be integrated, as for example a third pair of switches in turn comprising two on-off switching units connected in parallel to the other pair of switching units in the manner as described for the second pair of switches.

According to a further aspect, a corresponding vehicle door handle system comprises the above described control unit besides the vehicle door handle according to the preceding aspects.

The control unit may in turn be adapted to detect an opening or closing request for a car door based on the input level at both, the first input of the control unit and the second input of the control unit.

BRIEF DESCRIPTION OF THE DRAWINGS

The disclosed embodiments have advantages and features, which will be more readily apparent from the detailed description, the dependent claims, and the accompanying figures and brief introduction of the Figures below.

DETAILED DESCRIPTION

Details on the embodiments according to the present disclosure shall be described with regard to the figures below.

Figure 1:
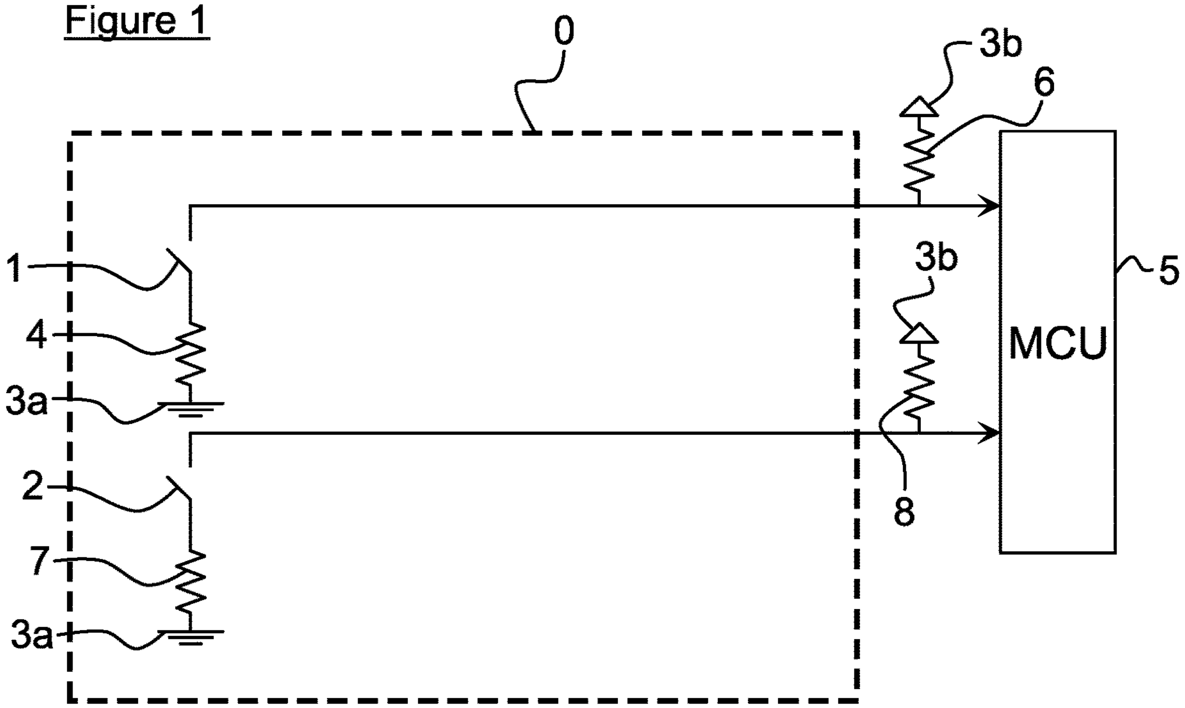
FIG. 1 shows a vehicle door handle according to the first aspect.

FIG. 1 shows an embodiment with one pair of switches connectable to a control unit 5. In detail, the vehicle door handle 0 comprises a first on-off switching unit 1 and a second on-off switching unit 2. A first terminal of the first on-off switching unit 1 is connected to a first potential 3*a*, which is ground, via a first resistor 4. The second terminal of the first on-off switching unit 1 is in turn connectable to a first input of the control unit 5. As may be taken from FIG. 1, the second terminal of the first on-off switching unit 1 is also connected to a second potential 3*b*, which is a positive voltage in this case, via a second resistor 6.

In a similar manner, an equivalent second branch is formed as can be taken from the below part of FIG. 1. In detail, a first terminal of the second on-off switching unit 2 is connected to ground 3*a* via a third resistor 7. The second terminal of the second on-off switching unit 2 is in turn connectable to a second input of the control unit 5 and the second terminal of the second on-off switching unit 2 is also connected to the second potential 3*b*, the positive voltage, via a fourth resistor 8.

Hence, if the first switching unit 1 is open, the input level at the first input of the control unit 5 is pulled up to the second potential 3*b*, the positive voltage, via the resistor 6. If, however, the switching unit 1 is closed, the input level at the first input of the control unit 5 is pulled down via the resistor 4 to the first potential 3*a*, which is ground. The same also applies to the branch shown below and the potential at the second input of the control unit 5, respectively.

Hence, the control unit 5 can detect a request for opening a door if both switching units 1 and 2 are closed and the input levels at the first and the second input of the control unit 5 is pulled to ground via resistors 4 and 7 and thus to the low level.

Since the two switching units 1 and 2 need to be pressed simultaneously, accidentally opening the car door is avoided since an error in both of the switching units 1 and 2 at the same time is less likely than an error in conventional SPDT switches.

Figure 2:
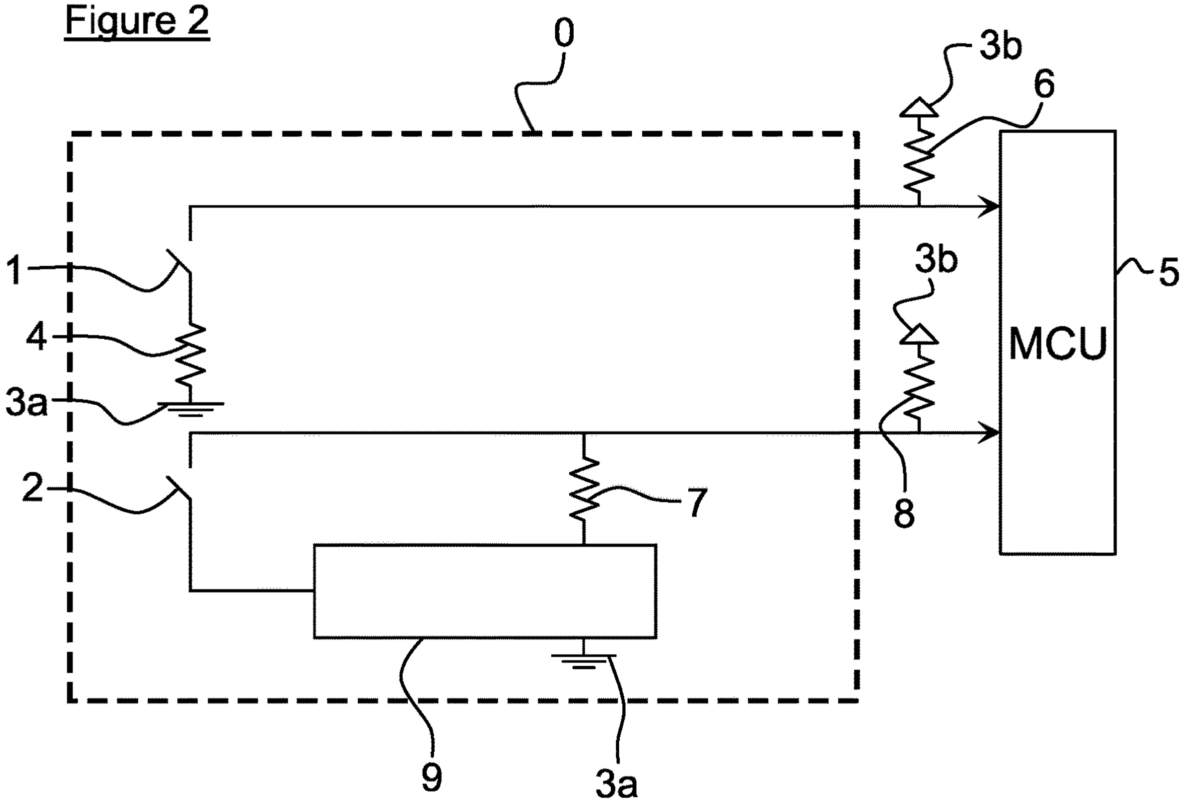
FIG. 2 shows a vehicle door handle with the additional inverting unit.

In FIG. 2, an embodiment is shown which further includes an inverting unit 9.

As the upper branch including the first on-off switching unit 1 is identical to the one shown in FIG. 1, it is referred to the above description of FIG. 1 for the first branch. In the second branch, the additional inverting unit 9 is included. This inverting unit 9 comprises a first terminal, a second terminal and a third terminal. The first terminal of the inverting unit 9 is connected to the first terminal of the second on-off switching unit 2, the second terminal of the on-off switching unit 2 is again connected to the second potential 3*b*, here, a positive voltage, via the fourth resistor 8. The third resistor 7 is now connected between the second terminal of the inverting unit 9 and the second terminal of the second on-off switching unit 2 and is connectable to the second input of the control unit 5, respectively.

With the implementation of the inverting unit 9 as to connect the second terminal of the inverting unit 9 with the third terminal of the inverting unit 9 if the on-off switching unit 2 is open, a connection between the resistor 7 and ground 3*a*, which is connected to the third terminal of the inverting unit 9, is made if the second on-off switching unit 2 is open. Hence, if the switches 1 and 2 are open, in the present embodiment, the input level at the first input of the control unit 5 is low since it is pulled down while the input level at the second input of the control unit 5 is high since the connection to ground 3*a* in the second branch is open and thus, the input level is pulled up to a high level due to the connection to potential 3*b* via resistor 8.

Hence, if the switching units 1 and 2 are in the same state, the input level at the first input and at the second input of the control unit 5 are always inverted. This will mimic the behavior of conventional units while still having the further technical and security benefits as described herein.

Figure 3:
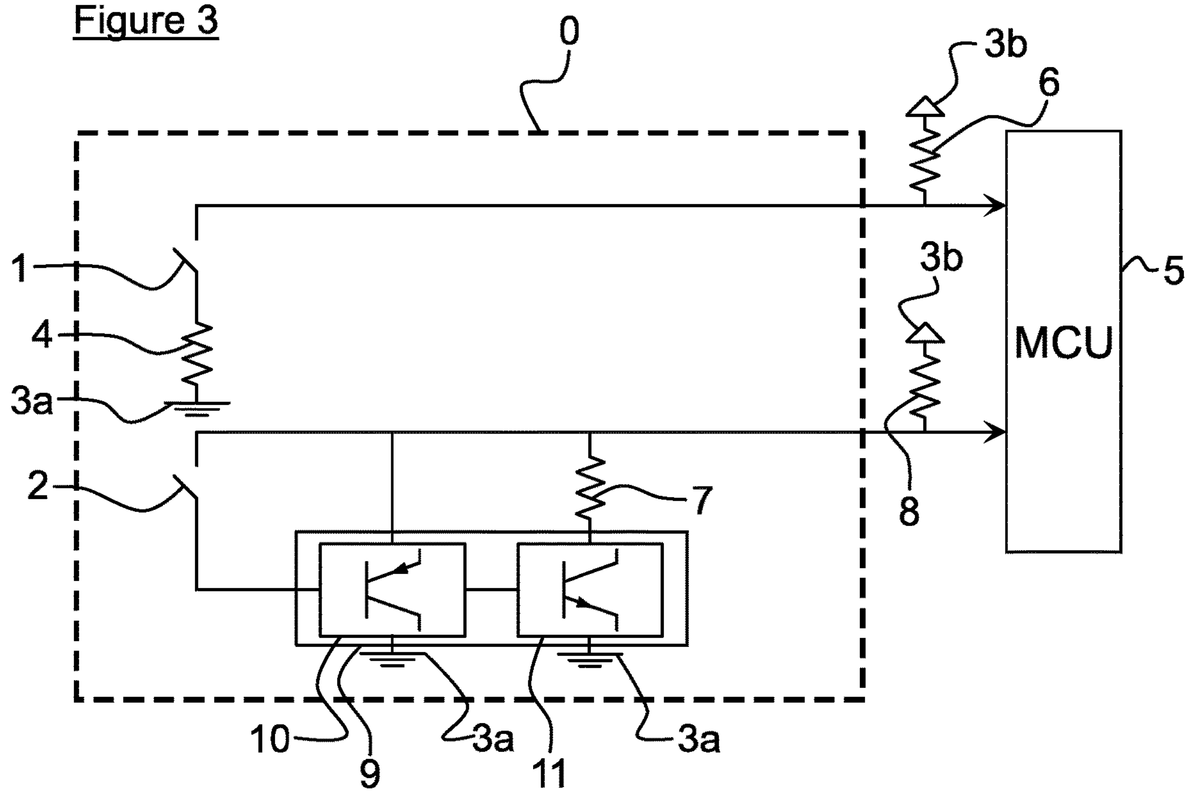
FIG. 3 shows the vehicle door handle with the inverting unit implemented as a transistor net.

In FIG. 3 it is shown that the inverting unit 9 may be constructed by using two transistors 10 and 11. In the embodiment shown here, a first transistor 10 is a PNP transistor while a second transistor 11 is a NPN transistor. As to implement the inverting unit 9 in the embodiment shown in FIG. 3, the base of the first transistor 10 is connected to the first terminal of the second on-off switching unit 2, while the base of the second transistor 11 is connected to the first transistor 10. The second transistor 11 is then connected in a manner between ground 3*a* and the resistor 7, that if the second on-off switching unit 2 is open, a connection is formed between the third resistor 7 and ground 3*a* via the second transistor 11.

In one embodiment, which shall also be described with regard to FIG. 3, the first transistor 10 is connected such that the emitter of the first transistor 10 is connected to the second terminal of the second on-off switching unit 2, and the second input of the control unit 5, respectively. The collector of the first transistor is in turn connected to ground 3*a*. The base of the second transistor 11 is connected to the collector of the first transistor 10, while the collector of the second transistor 11 is connected to the third resistor 7 and the emitter of the second transistor 11 is connected to ground 3*a*.

With the use of this transistor net, reliable and fast switching also with low voltage differences is made possible without requiring an additional voltage supply, since the whole transistor net can be supplied via the two potentials 3*a* and 3*b* as shown in the Figures.

Figure 4:
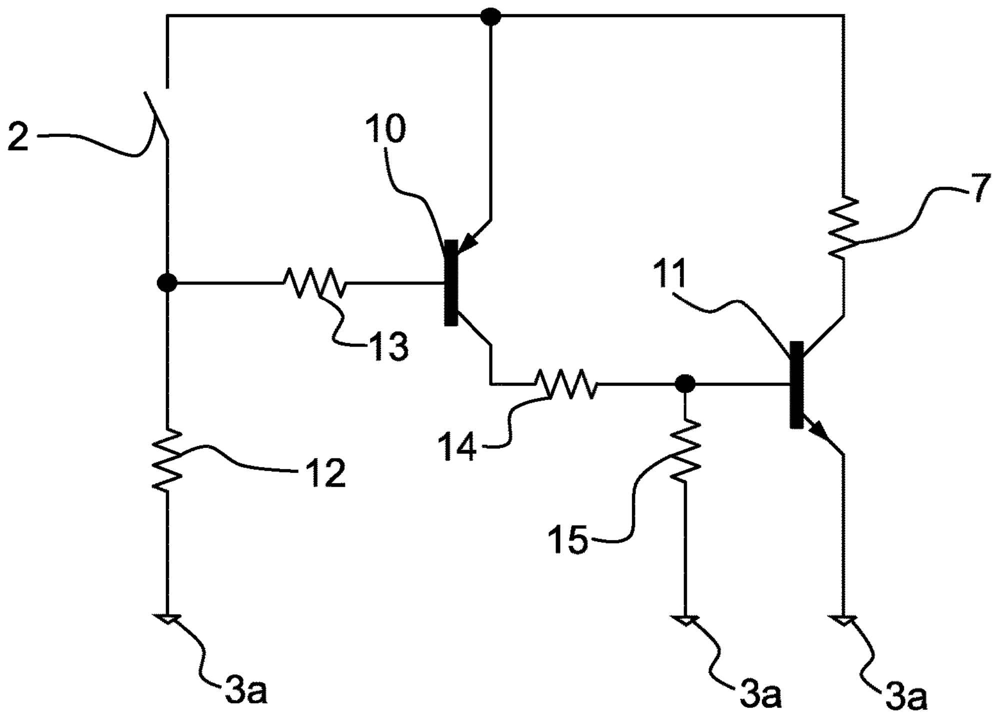
FIG. 4 shows the implementation of the inverting unit according to one embodiment.

With regard to FIG. 4, details on a possible implementation of the transistor net shall be described. As may be taken from FIG. 4, an additional fifth resistor 12 may be connected between the first terminal of the second on-off switching unit 2 and ground 3*a*. Further, a sixth resistor 13 will be integrated between the base of the first transistor 10 and the first terminal of the second on-off switching unit 2. A seventh transistor 14 can be integrated between the collector of the first transistor 10 and the base of the second transistor 11 and an eighth resistor 15 can be connected between the base of the second transistor 11 and ground 3*a*.

The dimensions of the resistors may for example be 47 kΩ for the fifth resistor 12, 100 Ω 0 for the sixth resistor 13, 1 kΩ for the seventh resistor 14, 47 kΩ for the eighth resistor 15 and 110Ω for the third resistor 7.

Figure 5:
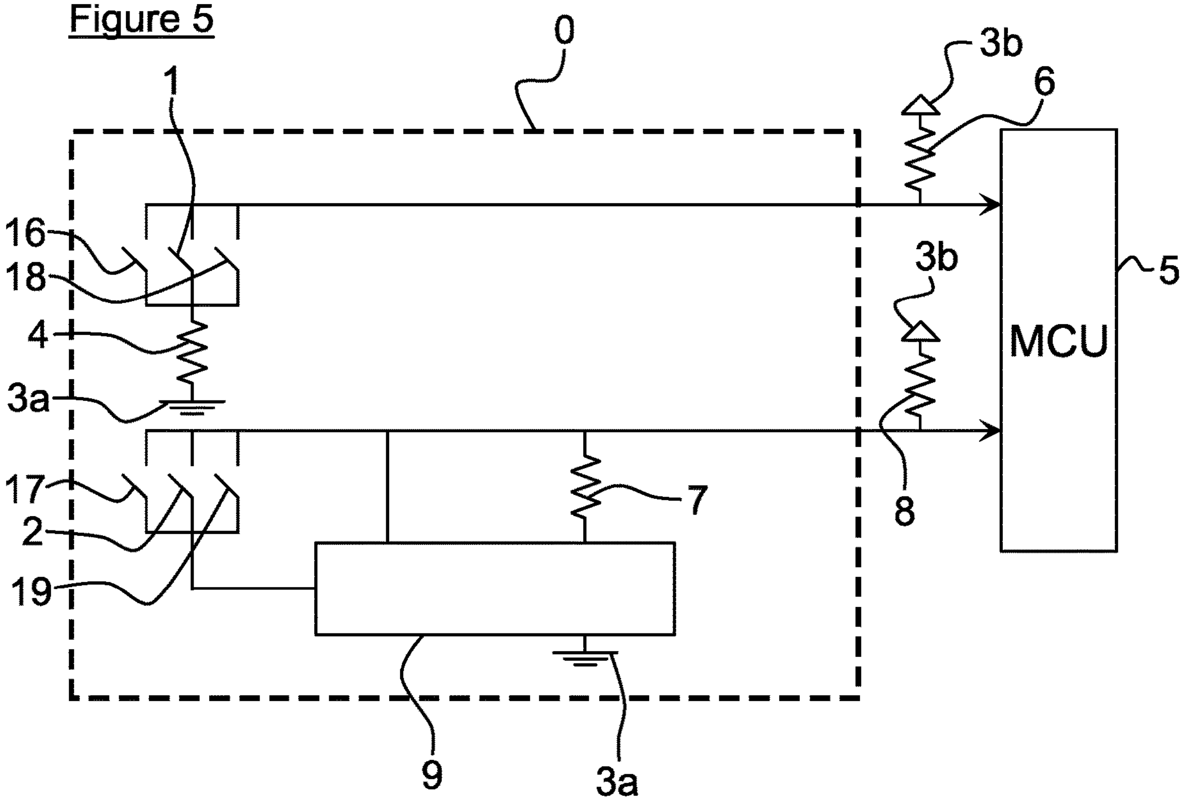
FIG. 5 shows an embodiment with six switching units.

In FIG. 5, a system is shown, which includes multiple pairs of switches. As can be taken from the Figure, a second and a third pair of switches is integrated in addition to the first pair. Hence, in addition to the first pair including the first on-off switching unit 1 and the second on-off switching unit 2, a second pair is provided comprising a third on-off switching unit 16 and a fourth on-off switching unit 17. In addition, a third pair is provided comprising a fifth on-off switching unit 18 and a sixth on-off switching unit 19. The first, the third, and the fifth on-off switching units 1, 16, 18 are arranged in parallel and the second, the fourth, and the sixth on-off switching units 2, 17, 19 are arranged in parallel. Hence, as to generate the required input to open or close the door via the control unit 5, either of the pairs of switching units needs to be pressed.

Figure 6:
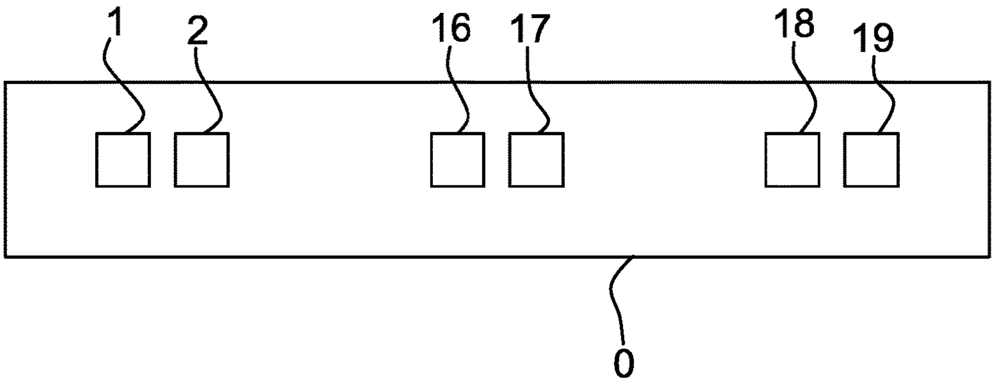
FIG. 6 shows the arrangement of switching units on the vehicle door handle system.

An arrangement of the switches with three pairs of switches is shown in FIG. 6. Here, it may be taken that always the switching units of one pair are located next to each other in close proximity to one other. As to generate the request for opening the door, the user thus needs to put one finger on one of the pairs of switching units to instruct the control unit accordingly. Hence, with providing additional pairs of switches, a larger area on the door handle may be used to open or close the door.

The invention claimed is:

1. A vehicle door handle, comprising:

a first pair of switches comprising a first on-off switching unit and a second on-off switching unit, wherein, the switching units of the first pair of switches are arranged adjacent to one another on the door handle, the first on-off switching unit is connectable to a first input of a control unit to control switching between a high level and a low level at the first input, the second on-off switching unit is connectable to a second input of the control unit to control switching between a high level and a low level at the second input, and an inverting unit to invert a functionality of the second on-off switching unit such that a second branch comprising the second on-off switching unit and being connectable to the second input of the control unit, behaves in the opposite way than a first branch which includes the first on-off switching unit and is connectable to the first input of the control unit.

2. The vehicle door handle according to claim 1, wherein:

a first terminal of the first on-off switching unit is connected to a first potential via a first resistor, a second terminal of the first on-off switching unit is connected to a second potential via a second resistor, and the second terminal of the first on-off switching unit is connectable to the first input of the control unit.

3. The vehicle door handle according to claim 2, wherein:

a first terminal of the second on-off switching unit is connected to the first potential via a third resistor, a second terminal of the second on-off switching unit is connected the second potential via a fourth resistor, and the second terminal of the second on-off switching unit is connectable to the second input of the control unit.

4. The vehicle door handle according to claim 1, wherein the an inverting unit comprises a first terminal, a second terminal, and a third terminal.

5. The vehicle door handle according to claim 4, wherein:

a first terminal of the first on-off switching unit is connected to a first potential via a first resistor, a second terminal of the first on-off switching unit is connected to a second potential via a second resistor, and the second terminal of the first on-off switching unit is connectable to the first input of the control unit.

6. The vehicle door handle according to claim 5, wherein:

a first terminal of the second on-off switching unit is connected to the first terminal of the inverting unit, a second terminal of the second on-off switching unit is connected the second potential via a fourth resistor, and the second terminal of the second on-off switching unit is connectable to the second input of the control unit.

7. The vehicle door handle according to claim 6, wherein:

the second terminal of the inverting unit is connected to a first terminal of a third resistor, a second terminal of the third resistor is connected to the second terminal of the second on-off switching unit, and the third terminal of the inverting unit is connected to the first potential.

8. The vehicle door handle according to claim 7, wherein the inverting unit is arranged to connect the second terminal of the inverting unit to the third terminal of the inverting unit if the second switch is open and to disconnect the second terminal of the inverting unit from the third terminal of the inverting unit if the second switching unit is closed.

9. The vehicle door handle according to claim 8, wherein the inverting unit comprises a first and a second transistor.

10. The vehicle door handle according to claim 9, wherein the first transistor comprises a PNP transistor, and the second transistor comprises an NPN transistor.

11. The vehicle door handle according to claim 9, wherein:

the first potential is ground, and the second potential is a positive voltage.

12. The vehicle door handle according to claim 11, wherein:

an emitter of the first transistor is connected to the second terminal of the second on-off switching unit, and an emitter of the second transistor is connected to ground.

13. The vehicle door handle according to claim 12, wherein the door handle further comprises:

a fifth resistor connected between the first terminal of the second on-off switching unit and ground;

a sixth resistor connected between the first terminal of the second on-off switching unit and a base of the first transistor;

a seventh resistor connected between a collector of the first transistor and a base of the second transistor; and an eighth resistor connected between the base of the second transistor and ground.

14. The vehicle door handle according to claim 13, wherein the collector of the second transistor is connected to the second terminal of the inverting unit.

15. The vehicle door handle according to claim 1, further comprising a second pair of switches with a third on-off switching unit and a fourth on-off switching unit.

16. The vehicle door handle according to claim 15, wherein:

the third on-off switching unit is connected in parallel to the first on-off switching unit, and the fourth on-off switching unit is connected in parallel to the second on-off switching unit.

17. The vehicle door handle according to claim 16, wherein the switching units of the second pair of switches are arranged adjacent to one another on the door handle.

18. The vehicle door handle according to claim 17, wherein the first pair of switches and the second pair of switches are spaced apart.

19. A vehicle door handle system, comprising:

the vehicle door handle according to claim 1, and the control unit.

20. The vehicle door handle system according to claim 19, wherein the control unit is adapted to detect an opening or closing request for a car door based on the first input of the control unit and the second input of the control unit.

* * * * *